Dec. 29, 1942. J. BOLF 2,306,930
PLOW
Filed Oct. 19, 1940 2 Sheets-Sheet 2
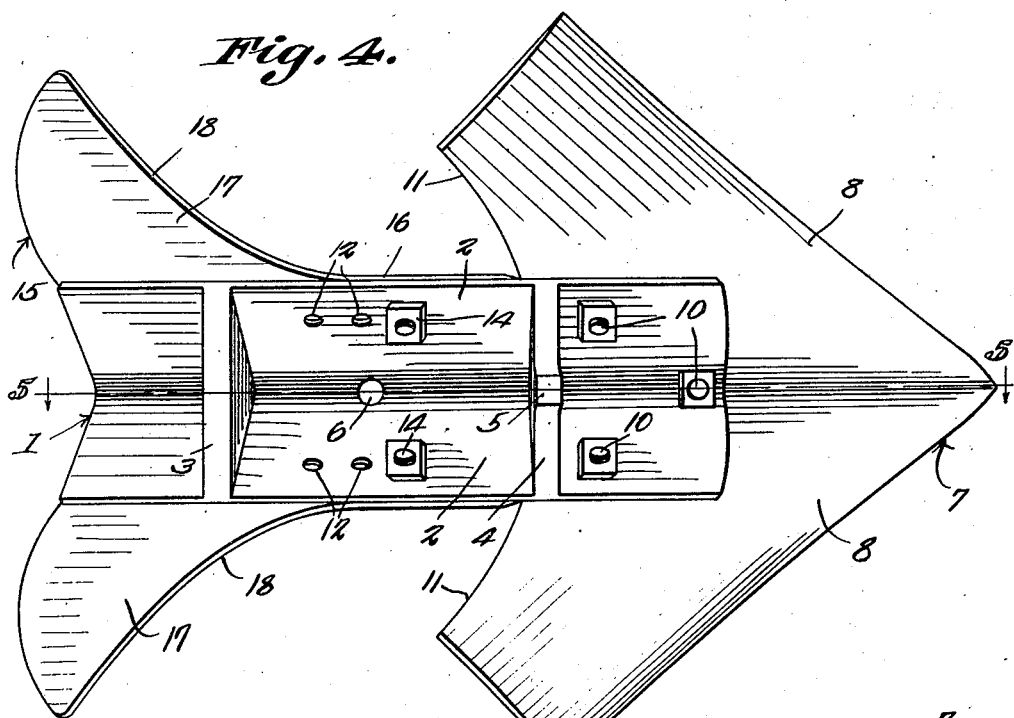
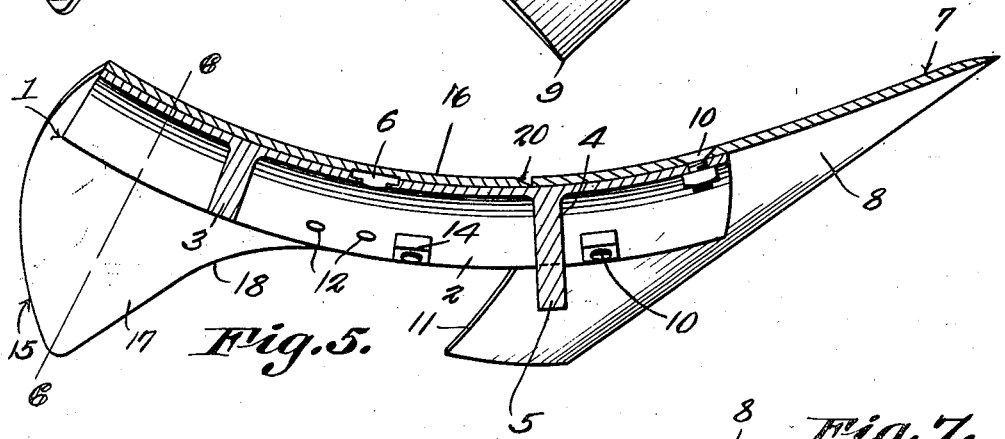
John Bolf
INVENTOR.
BY *C. A. Snow & Co.*
ATTORNEYS.

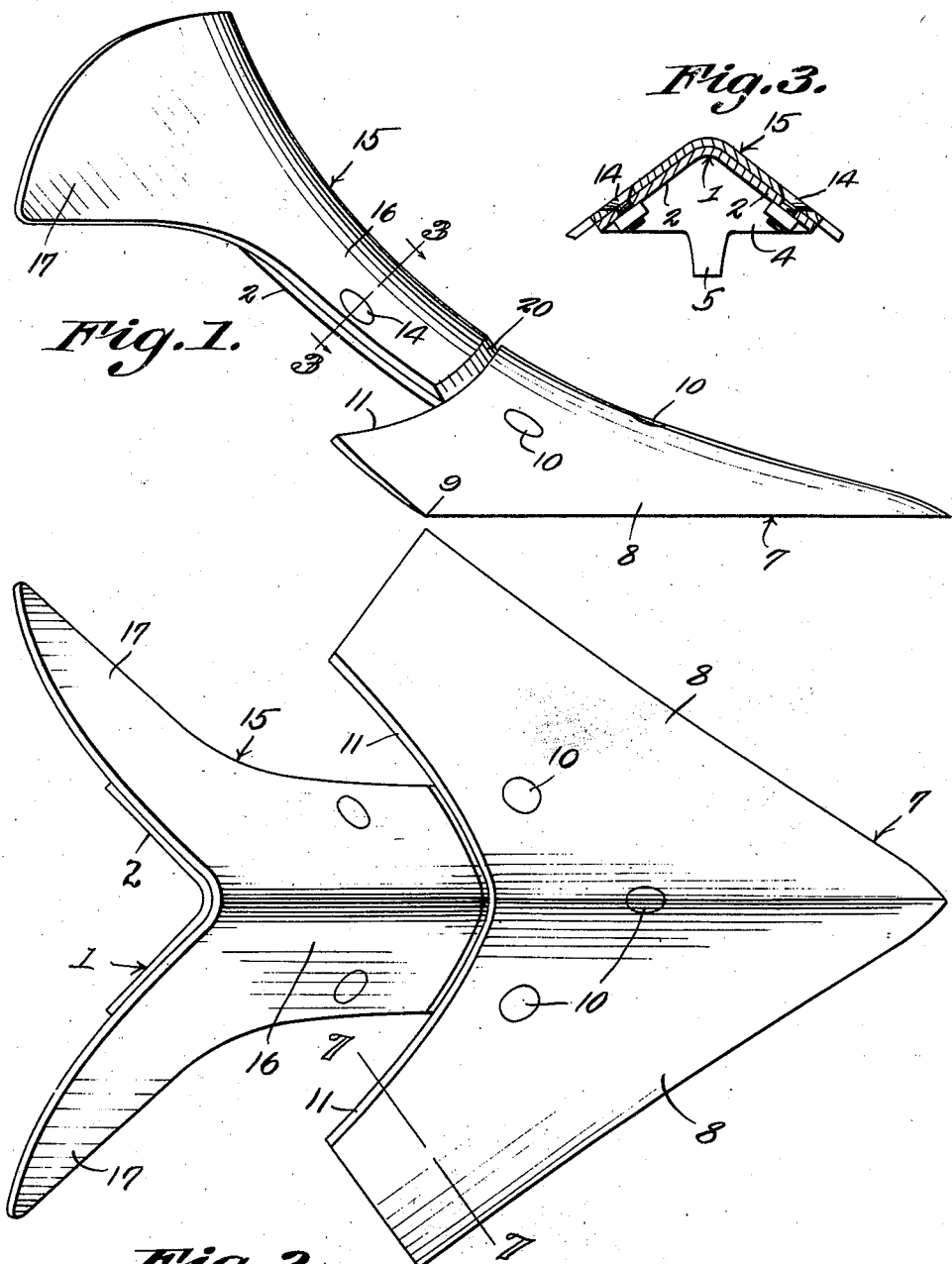

Patented Dec. 29, 1942

2,306,930

UNITED STATES PATENT OFFICE 2,306,930

PLOW

John Bolf, Levelland, Tex., assignor of one-fourth to Jess Boysen and one-fourth to Alvin R. Allison and Tom Gordon, jointly, all of Levelland, Tex.

Application October 19, 1940, Serial No. 361,959

1 Claim. (Cl. 97—112)

By way of explanation it may be stated that in many parts of the country, there are plains which, during the spring of the year, are subjected to severe dust storms, which cause the land to blow and dry out. The present invention aims to provide a plow which will loosen the soil in such a way as to preserve the moisture, the plow being adjustable as to height, so that the depth plowed may be regulated accordingly, the row bed remaining of the same width even though the soil may be plowed to different depths.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows, in side elevation, a device constructed in accordance with the invention;

Fig. 2 is a top plan;

Fig. 3 is a cross section on the line 3—3 of Fig. 1;

Fig. 4 is a bottom plan;

Fig. 5 is a section on the line 5—5 of Fig. 4;

Fig. 6 is a transverse section on the line 6—6 of Fig. 5;

Fig. 7 is a transverse section on the line 7—7 of Fig. 2.

The plow forming the subject matter of this application is made throughout, of metal of the kind commonly employed in the construction of plows.

The plow includes a frog 1, which is of inverted V-shape in cross section, the frog having downwardly diverging flanges 2, connected by an upper cross wall 3, and a lower cross wall 4, the cross walls being somewhat thicker than the flanges 2 of the frog 1. The lower or forward cross wall 4 has a reduced, downwardly extended lug 5, and there is an opening 6 in the ridge of the frog 1, the opening and the lug being employed for the purpose of attaching the implement to a standard (not shown).

The numeral 7 marks a point, which is of inverted V-shape in cross section, the point being shaped to fit on the forward portion of the frog 1. The point 7 includes rearwardly and downwardly diverging wings 8, sharpened at their forward edges, as indicated at 9. Securing elements 10, which may be bolts, pass through the wings 8 of the point 7 and through the flanges 2 of the frog 1, and connect the point 7 to the frog. The wings 8 of the point 7 extend outwardly, as shown in Fig. 4, beyond the outer longitudinal edges of the frog 1, the rear edges of the wings 8 being forwardly concaved, as shown at 11. The rear concaved edges 11 of the wings 8 are located closely adjacent to the lower or forward cross wall 4 of the frog 1.

Between the upper or rear cross wall 3 and the lower or forward cross wall 4, the flanges 2 of the frog 1 are supplied with longitudinally spaced holes 12, adapted to receive securing elements 14, such as bolts.

The numeral 15 marks a body which is of inverted V-shape in cross section. The body 15 includes a reduced shank 16, superposed on the flanges 2 of the frog 1, and connected thereto by the aforesaid securing elements 14, which may be mounted in any of the holes 12 in the flanges 2 of the frog 1. The upper or rear cross wall 3 of the frog 1 is disposed underneath the body 15, a little nearer to the rear end of the body than to the forward end thereof. The forward end of the shank 16 of the body 15 is bevelled, as shown at 20, so that when the body is adjusted forwardly, dirt and other accumulations will be scraped off the forward or upper surfaces of the frog flanges 2.

At its rear end, the body 16 is broadened to form outwardly extended arms 17 which diverge downwardly and rearwardly. The outer edges of the arms 17 are rearwardly concaved, as shown at 18 and merge into the longitudinal outer edges of the shank 16 of the body 15.

In practical operation, as the plow is drawn forward, the soil is loosened by the point 7, and some of the soil, passing rearwardly, moves over the rear edges 11 of the wings 8 of the point 7 and drops back into the furrow, moisture thus being preserved, and the land being prevented from turning to a dust, which can be blown about.

The body 15 and its arms 17, in view of the concaved edges 18, form the row bed.

It will be noted that the securing elements 14 can be shifted to any of the holes 12 in the frog 1, and the depth of plowing may be regulated accordingly. Notwithstanding this adjustment, for deep or shallow plowing, the shape of the side walls of the row bed will remain substantially unchanged, those walls being formed by the arms 17 of the body 15 and the concaved edges 18 thereof. The arms 17 extend outwardly a little less than do the rear or outer ends of the wings 8 of the point 7.

The device is simple in construction, but will be found thoroughly advantageous to consummate the objects set forth in the opening portion of this specification.

Having thus described the invention, what is claimed is:

In a plow, an inverted V-shaped frog, an inverted, V-shaped point seated upon the forward portion of the frog, the point comprising outwardly extended wings, the rear edges of the wings defining a continuous curve which is concaved toward the entering end of the point, an inverted, V-shaped body seated upon the rear portion of the frog, the body comprising outwardly extended arms, spaced from the wings longitudinally of the line of advance of the plow, the forward edges of the arms being concaved toward each other, with a forward convergence, the frog having front and rear cross walls which connect the side portions of the frog, there being forward openings in the side portions of the frog, and located closely in advance of the front wall, in the interest of reenforcement, securing devices connecting the wings with said side portions, and disposed in the openings, said side portions having apertures located between the cross walls, in the interest of reenforcement, and extended lengthwise of the frog, securing devices engaged with the arms and mountable in any of the apertures, for the longitudinal adjustment of the body, the rear cross wall being located far enough back so that it will at all times be beneath a portion of the body.

JOHN BOLF.